US010835855B2

(12) United States Patent
Castellanet

(10) Patent No.: US 10,835,855 B2
(45) Date of Patent: Nov. 17, 2020

(54) $CO_2$ ADSORPTION RECYCLER

(71) Applicant: LETSACT, Nice (FR)

(72) Inventor: Frederic Castellanet, Paris (FR)

(73) Assignee: LETSACT, Nice (FR)

( * ) Notice: Subject to any disclaimer, the term of this patent is extended or adjusted under 35 U.S.C. 154(b) by 652 days.

(21) Appl. No.: 14/774,867

(22) PCT Filed: Mar. 7, 2014

(86) PCT No.: PCT/EP2014/054435
§ 371 (c)(1),
(2) Date: Sep. 11, 2015

(87) PCT Pub. No.: WO2014/139880
PCT Pub. Date: Sep. 18, 2014

(65) Prior Publication Data
US 2016/0023156 A1 Jan. 28, 2016

(30) Foreign Application Priority Data
Mar. 13, 2013 (FR) ...................... 13 52234

(51) Int. Cl.
*B01D 53/04* (2006.01)
*B63C 11/24* (2006.01)

(52) U.S. Cl.
CPC ..... *B01D 53/0462* (2013.01); *B01D 53/0438* (2013.01); *B63C 11/24* (2013.01);
(Continued)

(58) Field of Classification Search
CPC ......... B63C 11/18; B63C 11/22; B63C 11/24; B01D 53/0462; B01D 53/0438;
(Continued)

(56) References Cited

U.S. PATENT DOCUMENTS 3,497,312 A * 2/1970 Bambenek ............. B01D 53/34
128/205.28
4,362,153 A * 12/1982 Wilson .................... A62B 7/10
128/202.26

(Continued)

FOREIGN PATENT DOCUMENTS

DE 198 16 373 A1 10/1999
EP 1 316 331 A1 6/2003
(Continued)

OTHER PUBLICATIONS

RU 2225322 C2 Translation Mar. 16, 2018.*
International Search Report, dated May 30, 2014, from corresponding PCT application.

*Primary Examiner* — Nyca T Nguyen
(74) *Attorney, Agent, or Firm* — Nixon & Vanderhye

(57) ABSTRACT

A system for extracting carbon dioxide from a mixture of gases that include at least carbon dioxide, wherein a reservoir is provided that contains a material capable of adsorbing the carbon dioxide, the reservoir having an inlet for the mixture and an outlet for a mixture that is at least partially purified of carbon dioxide, where the system also includes at least one element for heating the reservoir, at least one electronic control circuit that causes a heating of the reservoir when at least one condition is fulfilled, so as to give rise to the desorption of the carbon dioxide adsorbed on the material contained in the reservoir.

9 Claims, 4 Drawing Sheets

(52) U.S. Cl.
CPC .... *B01D 2256/12* (2013.01); *B01D 2257/504* (2013.01); *B01D 2259/402* (2013.01); *B01D 2259/4541* (2013.01); *Y02C 10/08* (2013.01)

(58) Field of Classification Search
CPC ...... B01D 2259/4541; B01D 2259/402; B01D 2257/504; B01D 2256/12; Y02C 10/08
See application file for complete search history.

(56) References Cited

U.S. PATENT DOCUMENTS

| | | | |
|---|---|---|---|
| 4,661,133 A * | 4/1987 | Lavie | B01D 53/04 62/636 |
| 5,720,279 A * | 2/1998 | Furuichi | B63C 11/186 128/201.27 |
| 5,876,488 A * | 3/1999 | Birbara | B01D 53/1475 422/178 |
| 6,361,696 B1 * | 3/2002 | Spiegelman | B01D 15/00 210/662 |
| 6,755,892 B2 * | 6/2004 | Nalette | A62B 11/00 95/11 |
| 6,895,961 B1 | 5/2005 | Todorov | |
| 8,424,515 B1 * | 4/2013 | MacCallum | B64G 6/00 128/201.13 |
| 2009/0095295 A1 * | 4/2009 | Wruck | A61M 16/009 128/203.26 |
| 2011/0174156 A1 * | 7/2011 | Saunders | B01D 53/1475 95/46 |
| 2011/0247396 A1 * | 10/2011 | Zhang | G01N 33/0029 73/31.05 |
| 2012/0160098 A1 | 6/2012 | Papale | |

FOREIGN PATENT DOCUMENTS

| | | |
|---|---|---|
| RU | 2225322 C2 * | 3/2004 |
| WO | 01/83294 A1 | 11/2001 |

* cited by examiner

$CO_2$ ADSORPTION RECYCLER

FIELD OF INVENTION

The invention relates to a carbon dioxide adsorption recycler designed particularly but not only to be immersed in a closed circuit.

BACKGROUND OF INVENTION

When diving in a self-contained diving suit, a diver breaths air or a gas mix from cylinders inside which gases are stored at high pressure that are supplied to him at ambient pressure through a pressure reducer. The breathed mix is rejected into the water. However the diver has only consumed a fraction of the oxygen present in the air or the mix, and unconsumed oxygen is discharged into the water. Therefore this system limits the duration of a dive. Furthermore, the formation of bubbles is unacceptable in some applications.

Closed circuit respirators comprise a cartridge through which the exhaled mix passes containing a material such as lime that traps carbon dioxide gas during an irreversible reaction. This system is not very practical because the cartridge is large and the system cannot be used to regenerate carbonated lime particularly during a dive. The invention aims at providing an alternative to this system.

It does this by disclosing a system for extraction of carbon dioxide from a gas mix comprising at least carbon dioxide, comprising at least one reservoir containing a material capable of adsorbing carbon dioxide, each reservoir being provided with an inlet for said mix and an outlet for a mix in which at least some of the carbon dioxide has been eliminated, and may also comprise:
  at least one means for heating said reservoir,
  at least one electronic control circuit designed to heat at least one reservoir when at least one condition is satisfied, so as to cause desorption of the carbon dioxide adsorbed on the material contained in the corresponding reservoir.

SUMMARY OF THE INVENTION

The invention is based on the use of a material that adsorbs carbon dioxide during a reversible reaction such as zeolites, active carbon or other. This material is contained in a reservoir provided with heating means, for example an electrical resistance. The system also comprises a means of storing electrical energy such as a battery, and an electronic control circuit that triggers regeneration of the material by heating the reservoir when a condition is satisfied. Since the adsorption reaction is reversible, carbon dioxide is separated from the material, is evacuated and the material can be reused.

The advantages are as follows:
  Saving in volume and therefore a compensating weight saving for the dive, because the lime cartridge is large,
  No longer any need to change the lime after every use, because it is wise to change the entire content of the cartridge if there is no possibility of regeneration and if there is no reliable criterion for the lime usage ratio,
  Lime is a polluting material for which the regulations impose incineration,
  As will be seen later, the possibility of regenerating the material during the dive, the quantity of carried material no longer limiting the duration of the dive as is the case with lime.

Throughout this text, the term purified mix refers to a gas mix from which at least some of the carbon dioxide has been extracted.

Advantageously, each reservoir may also comprise a mix inlet valve, a purified mix outlet valve and a carbon dioxide outlet valve, and said electronic control circuit is designed to cause closing of said mix inlet valve and purified mix outlet valve and opening of the carbon dioxide outlet valve when it causes heating of a reservoir.

During the desorption phase, the mix inlet and purified mix outlet valves of the reservoir are closed, all that is open is the carbon dioxide outlet valve.

The carbon dioxide outlet is separate from the purified mix outlet so that there is no risk of supplying carbon dioxide to the user.

Advantageously, the system may also comprise at least one means of measuring at least one parameter characterising the environment in which said system is located, and said condition applies to at least one environmental parameter.

Obviously, the condition mentioned above may be activation of the system by the user, but advantageously the system can be designed to detect a condition, for example an environmental condition, in which it triggers regeneration of the material automatically, the system then also comprising environment parameter sensors.

For example, the at least one measurement means may include a pressure sensor and/or a water presence sensor, said condition possibly applying to the pressure and/or presence of water.

Measuring the pressure and the presence of water helps to discriminate between "dive" and "surface" situations and therefore to automatically trigger regeneration after the diver has returned to the surface.

Advantageously, the system may comprise a first and a second reservoir each containing a material capable of adsorbing carbon dioxide, each reservoir also comprising a mix inlet valve, a purified mix outlet valve and a carbon dioxide outlet valve and possibly also comprising:
  a means of heating said material associated with each reservoir,
  an electronic control circuit,
  said electronic control circuit being designed to cause in each reservoir cycles comprising an adsorption period and a desorption period, said cycles being in phase opposition such that one of the reservoirs is in adsorption while the other is in desorption.

In this embodiment, the extraction system comprises two reservoirs as described above, each comprising a heating means, and an electronic control circuit that enables alternate operation of the system: each of the first and second reservoirs operates in cycles including an adsorption period and a desorption period, these cycles being in phase opposition such that there is always only one reservoir in heating and therefore in desorption, the other being in adsorption and therefore being used for breathing. This enables extraction system to operate continuously. In all cases, there is one reservoir that is not heated in adsorption, and one reservoir heated and therefore in desorption, except possibly at the beginning of the dive when the two reservoirs contain "new" material and at the end of the dive when the system can regenerate the material of one reservoir while the other is no longer in service.

In one embodiment, the extraction system may also comprise a clock, the period being changed when a duration condition is satisfied.

In this case the changeover, i.e. the change from an adsorption period to a desorption period, is controlled by a clock. The heating duration of a reservoir is modified as a function of the quantity of material contained in this reservoir.

In another embodiment, the system may also comprise at least one carbon dioxide gas concentration sensor, the change in the period being made when a condition on the concentration of carbon dioxide in the purified mix is satisfied.

In this case, the changeover takes place when the carbon dioxide sensor measures a concentration greater than a threshold fixed in advance in the purified mix at the outlet from a reservoir. The system may comprise such a sensor at the outlet from each reservoir, or a single sensor mounted on the purified mix circuit knowing that the carbon dioxide currently being desorbed is evacuated from the reservoirs through specific bleed outlets.

Advantageously, the adsorption periods of the first and the second reservoirs may overlap.

For safety reasons, adsorption periods of reservoirs may overlap slightly to assure a continuous supply of the breathable mix to the diver.

Advantageously, the system may be embedded in a resin block.

In this way, the electronic control circuit and the battery are protected from contact with water. The battery is of the type that is recharged by induction.

When the extraction system comprises one or more sensors, this or these sensors are mounted either flush with the surface of the resin block and sealed in it (humidity or water presence sensor) or are built into this block but very close to the surface (pressure sensor).

The invention also relates to a closed circuit breathing system for a diver comprising a breathing end piece fitted with an inhalation pipe and an exhalation pipe, a breathing bag connected to said inhalation pipe, a cylinder containing compressed oxygen for introduction of oxygen into said breathing bag and that may comprise a carbon dioxide extraction system according to the invention, the inlet of which is connected to said exhalation pipe and the outlet of which is connected to said breathing bag.

A closed circuit breathing system comprises a primary circuit leading the mix exhaled by the diver to the inlet to an extraction system, and a secondary circuit connected to the outlet from the extraction system and leading the purified mix into the breathing bag. The breathing system also comprises a compressed oxygen cylinder that releases oxygen into the breathing bag. The diver breathes in from this breathing bag.

The operating method is different depending on whether the carbon dioxide extraction system comprises one or two reservoirs.

When the carbon dioxide extraction system comprises one reservoir, in a first phase, the diver uses the breathing system in a conventional manner. In a second phase, the material contained in the reservoir is being regenerated and the diver can no longer use the breathing system, he has to wait until the end of desorption of carbon dioxide.

The operating phase change is made either at the request of the user or when a condition is satisfied, this condition possibly being when the diver returns to the surface. In this way, the diver no longer has to be concerned about restarting regeneration of the adsorbed material.

When the carbon dioxide extraction system comprises two reservoirs mounted in parallel in the breathing circuit, these reservoirs are in service alternately, in other words the mix exhaled by the diver passes through them and they are in regeneration alternately, such that one reservoir is in service while the other is in regeneration. In this way, the breathing system may operate continuously, the duration of the dive being limited by the battery capacity rather than by saturation of the carbon dioxide extraction material.

BRIEF DESCRIPTION OF THE DRAWINGS

Embodiments and variants will be disclosed below as non-limitative examples with reference to the appended drawings in which.

DETAILED DESCRIPTION OF THE INVENTION

Figure 1:
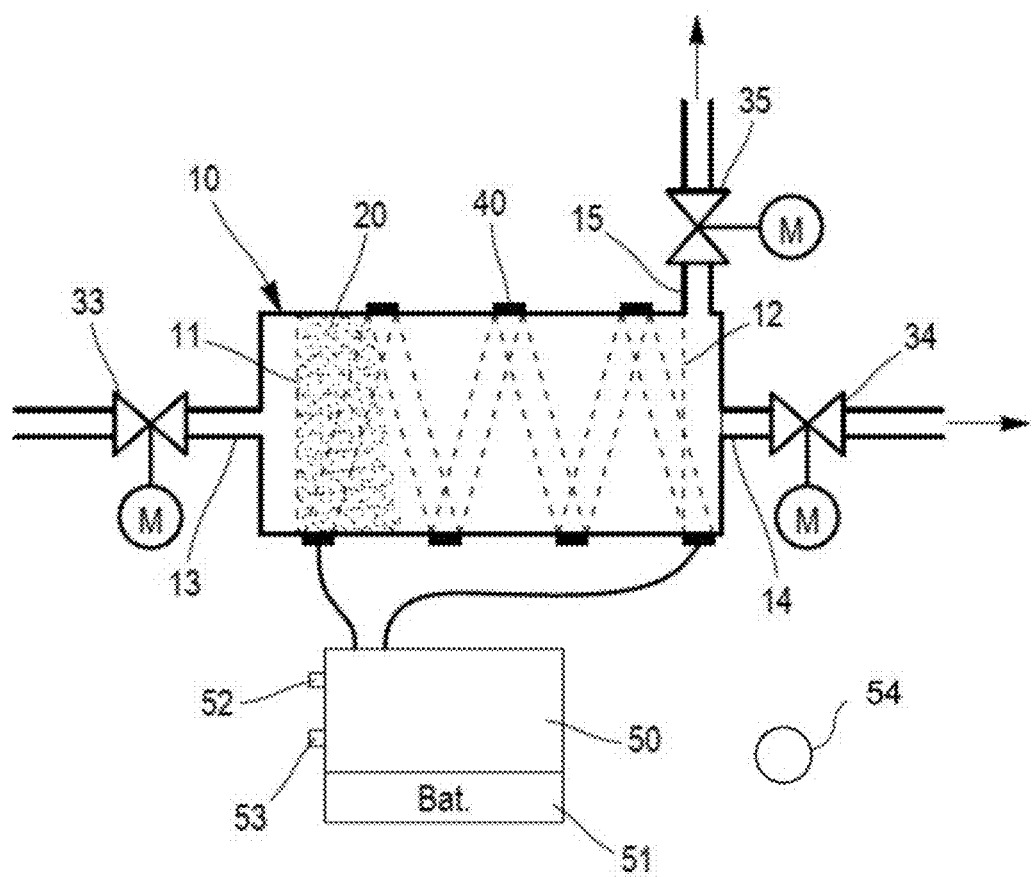
FIG. 1 diagrammatically shows a carbon dioxide extraction system according to the invention.

FIG. 1 diagrammatically shows a carbon dioxide extraction system for a gas mix comprising a reservoir 10 (shown in section partially filled for reasons of clarity of the drawing) containing a material 20 with the capacity of adsorbing carbon dioxide, such as zeolites, active carbon or other, held in place between two transverse grids 11 and 12. This reservoir comprises:

an inlet 13 for the mix containing carbon dioxide; this inlet is controlled by a motor-driven valve 33, an outlet 14 for the purified mix, in other words from which the majority of the carbon dioxide gas has been removed; this outlet is controlled by a motor-driven valve 34, a bleed outlet 15 for evacuation of carbon dioxide during the regeneration phases; this bleed outlet is controlled by a motor-driven valve 35.

An electrical resistance 40 surrounds the receptacle 10 so as to heat the material 20 during the regeneration phases. Obviously other requirements are possible, for example a dive resistance within this material.

The resistance 40 is connected to a battery 51 through an electronic control circuit 50. The motors of the valves 33, 34, 35 are also connected to the electronic control circuit (not shown).

The extraction system may also comprise a clock 54, the period being changed when a duration condition is satisfied.

In this case the changeover, i.e. the change from an adsorption period to a desorption period, is controlled by a clock 54. The heating duration of a reservoir is modified as a function of the quantity of material contained in this reservoir.

This system comprises two clearly distinct operating modes controlled by the electronic circuit 50:

In a first mode, the system is used to extract carbon dioxide from a gas mix, for example the mix exhaled by a diver, and to return it to the diver's breathing bag; in this first mode, the inlet valve 33 and the outlet valve 34 are open, the bleed outlet valve 25 is closed and the resistance 40 is not powered, In a second mode, the system is used to regenerate the material that adsorbed carbon dioxide; in this second mode, the inlet valve 33 and the outlet valve 34 are closed, the bleed outlet valve 25 is open and the resistance 40 is powered. The heating duration and intensity are dependent on the nature and quantity of material present in the reservoir 10. Carbon dioxide is evacuated through the purge outlet 15; this outlet is fitted with a non-return valve, for example to prevent water from entering the reservoir 10.

Obviously, the system cannot be used for breathing in this second mode.

The system may comprise one or more sensors that the electronic control circuit 50 uses to detect the end of a dive and to automatically trigger the regeneration phase, for example a pressure sensor 52 and a water presence sensor 53 connected to said electronic circuit. A dive situation will be characterised by:

Presence of water and pressure>1 bar, and the surface situation will be characterised by:

No water and pressure<1.2 bars.

The water presence detector can use different properties, for example conductivity, speed of sound, etc.

This automatic control is associated with a safety device so that a regeneration cycle will not start unexpectedly during a dive, for example a timeout. Similarly, the power supply to the resistance 40 may depend on information feedback that valves 33 and 34 are actually closed and that valve 35 is actually open.

Figure 2:
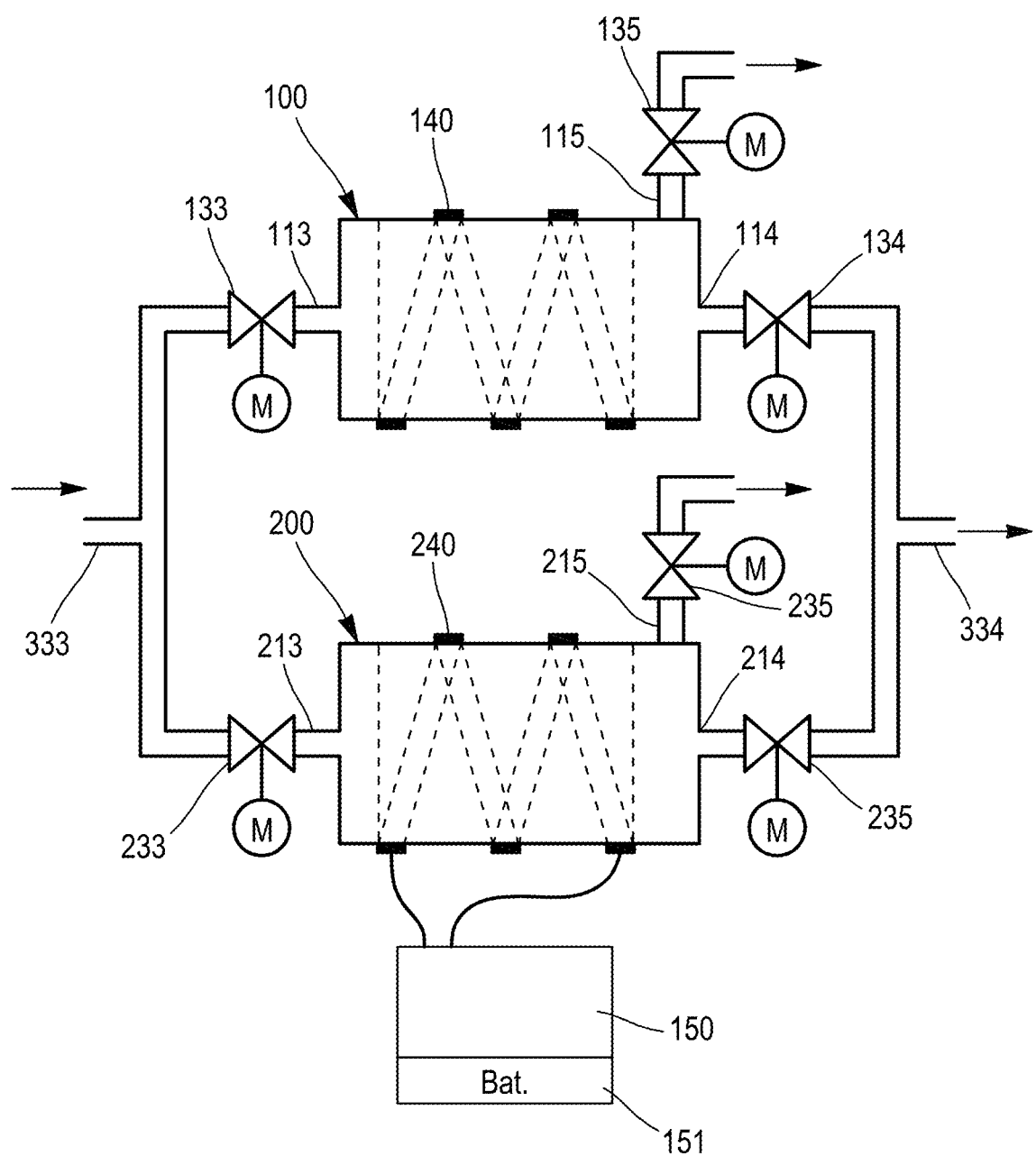
FIG. 2 diagrammatically shows a second embodiment of a carbon dioxide extraction system according to the invention.

FIG. 2 shows a carbon dioxide extraction system comprising two reservoirs 100, 200 identical to the reservoir described above, in other words each comprising an inlet 113, 213 and an outlet 114, 214, and a bleed outlet 115, 215. Each inlet or outlet is controlled by a motor-driven valve 133, 233, 134, 234, 135, 235 respectively.

The two reservoirs 100, 200 are connected in parallel through pipes so as to have a common inlet 333 for the mix containing carbon dioxide, and a common outlet 334 for the mix from which carbon dioxide has been removed. The bleed outlets 115, 215 may remain independent as shown in FIG. 2 or they may be combined into a common bleed outlet.

Each reservoir 100, 200 comprises an electrical resistance 140, 240 to heat the material contained in these reservoirs; these resistances are connected to an electrical battery 151 through an electrical control circuit 150 (not shown for the resistance 140).

The motors of valves 133, 233, 134, 234, 135, 235 are also connected to the electronic control circuit (not shown).

This system operates according to a changeover system in which one of the reservoirs is in adsorption while the other is in regeneration, the changeover being generated by the electronic circuit 150. Thus:

Reservoir 100 in adsorption and reservoir 200 in regeneration: valves 133 and 134 open, valve 135 closed, valves 233 and 234 closed, valve 235 open, resistance 140 not powered, resistance 240 powered, Reservoir 100 in regeneration and reservoir 200 in adsorption: valves 133 and 134 closed, valve 135 open, valves 233 and 234 open, valve 235 closed, resistance 140 powered, resistance 240 not powered.

Obviously, valves 233 and 233 and valves 234 and 234 may be replaced by a three-way valve.

The changeover is controlled by the electronic circuit 150 as a function of:

A duration, the duration of the regeneration phases of different reservoirs being approximately equal, and necessarily equal to or shorter than the duration of the adsorption phases, A concentration of carbon dioxide measured at the outlet 114, 214 from each reservoir.

As before, this system may be fitted with water presence and/or pressure sensors to detect the beginning of the dive (startup of the system) and the end of the dive (stopping the system after a final regeneration).

Figure 3:
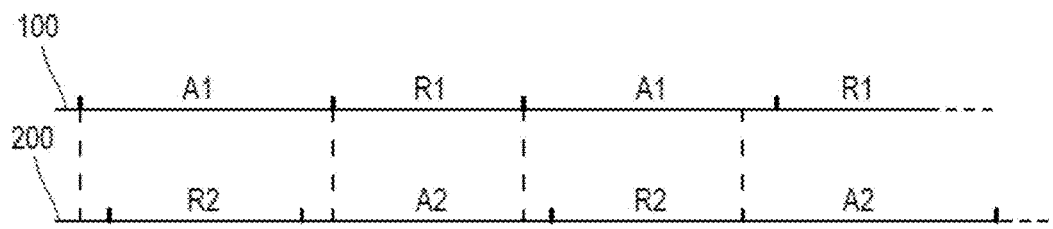
FIG. 3 diagrammatically shows adsorption and regeneration cycles of the carbon dioxide extraction system shown in FIG. 2.

Note that there may be a slight overlap of adsorption phases as shown in FIG. 3 for safety reasons: the line 100 illustrates the cycle of the reservoir 100, line 2 illustrates the cycle of reservoir 200. The adsorption phases during which the corresponding reservoir supplies mix to the diver, are denoted A1 and A2; the regeneration phases are denoted R1 and R2. It can be seen that phases A1 and A2 overlap slightly during the changeover. In particular, this avoids supplying the diver with a mix that is too warm; the reservoir is hot at the end of a regeneration cycle R1, R2 and the mix without CO2 that it supplies at the beginning of an adsorption phase A1, A2 will be warm; the overlap gives time to mix gases output by the two reservoirs and therefore to lower its temperature.

Figure 4:
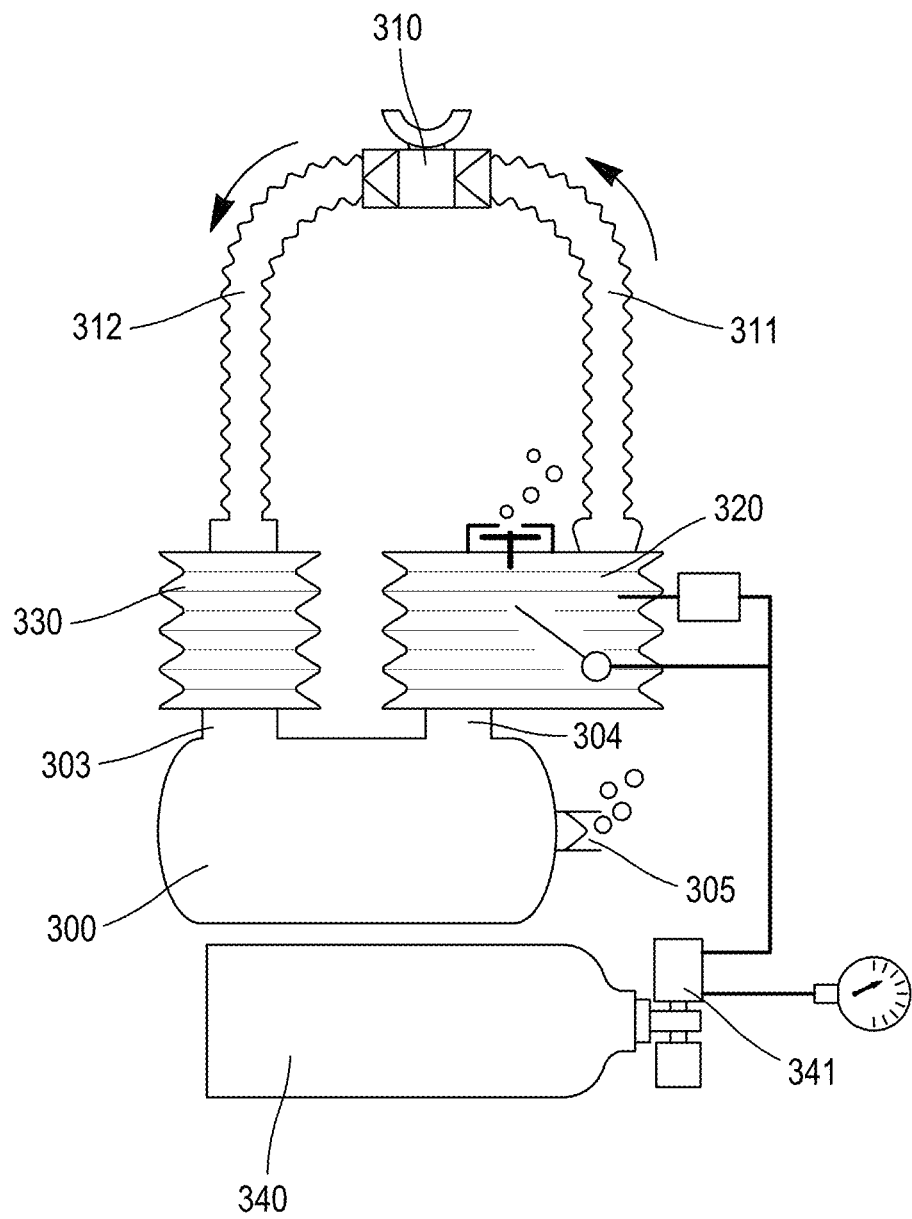
FIG. 4 diagrammatically shows a closed circuit breathing system for a diver using a carbon dioxide extraction system according to the invention.

FIG. 4 represents a closed circuit breathing system for a diver comprising a carbon dioxide purification system 300 according to the invention, for example embedded in a resin block. As described above, this purification system comprises one or two reservoirs filled with a material capable of adsorbing carbon dioxide, an electronic control circuit and a battery.

The breathing system conventionally comprises an end piece 310 fitted with valves, connected to two splined pipes, an intake pipe 311 and an outlet pipe 312. The outlet pipe 312 supplies a mix containing carbon dioxide in a breathing bag 330 connected to the inlet 303 of the purification system 300. However, the exhalation pipe 312 could be connected directly to the purification system.

The purification system 300 supplies a purified mix through its outlet 304 to a breathing bag 320. During the desorption phase of the purification system 300, carbon dioxide escapes through an outlet 305.

A compressed gas cylinder 340 containing oxygen supplies oxygen through a pressure reducer 341 into a breathing bag 320, so as to form a mix that the diver is able to breathe. The intake pipe 311 is connected to the intake bag 320 and it supplies a mix that the diver can breathe through the end piece 310.

The invention claimed is:

1. A system for a diver breathing apparatus for extraction of carbon dioxide from a gas mix that has at least carbon dioxide, the system comprising:

a reservoir, which comprises a material configured to adsorb carbon dioxide within said reservoir, at least one means for heating said reservoir, an inlet for said gas mix, and an outlet for an output mix of gases from which at least some of the carbon dioxide has been eliminated;

an end piece, in fluid communication with said reservoir via an intake pipe, configured for a user to breathe gas therethrough; and an electronic control circuit, connected to said at least one means for heating said reservoir and configured to heat said reservoir when at least one condition is satisfied, so as to cause desorption of the carbon dioxide adsorbed on the material contained in said reservoir, wherein the reservoir and the electronic circuit are embedded in a resin block.

2. The system for extraction of carbon dioxide according to claim 1, wherein said reservoir further comprises a mix inlet valve, a purified mix outlet valve and a carbon dioxide outlet valve, and said electronic control circuit is configured to close said mix inlet valve and said purified mix outlet valve and to open the carbon dioxide outlet valve when said electronic control circuit causes heating of said reservoir.

3. The system for extraction of carbon dioxide according to claim 2, further comprising
at least one means of measuring at least one parameter characterising the environment in which said system is located, and said condition applies to at least one environmental parameter.

4. The system for extraction of carbon dioxide according to claim 1, further comprising:
at least one means of measuring at least one parameter characterising the environment in which said system is located, and said condition applies to at least one environmental parameter.

5. The system for extraction of carbon dioxide according to claim 4, wherein the at least one means of measuring includes a pressure sensor and/or a water presence sensor, and said condition applies to a pressure and/or a presence of water.

6. A closed circuit breathing system for a diver, comprising:
a end piece, fitted with an inhalation pipe and an exhalation pipe, configured for a user to breathe gas therethrough;
a breathing bag connected to said inhalation pipe;
a cylinder containing compressed oxygen for introduction of oxygen into said breathing bag; and
an extraction system for extraction of carbon dioxide from a gas mix comprising at least carbon dioxide, comprising:
a reservoir, which a material configured to adsorb carbon dioxide within the reservoir, at least one means for heating said reservoir, an inlet for said gas mix, and an outlet for an output mix of gases from which at least some of the carbon dioxide has been eliminated, and
at least one electronic control circuit connected to said at least one means for heating said reservoir and configured to heat said reservoir when at least one condition is satisfied, so as to cause desorption of the carbon dioxide adsorbed on the material contained in said reservoir,
wherein the inlet of the reservoir is connected to said exhalation pipe and the outlet of the reservoir is connected to said breathing bag, and
wherein the extraction system is embedded in a resin block.

7. The closed circuit breathing system for a diver according to claim 6, wherein the extraction system further comprises at least one means of measuring at least one parameter characterising the environment in which said system is located, and said condition applies to at least one environmental parameter.

8. The closed circuit breathing system for a diver according to claim 7, wherein the at least one means of measuring includes a pressure sensor and/or a water presence sensor, and said condition applies to a pressure and/or a presence of water.

9. The closed circuit breathing system for a diver according to claim 6, wherein said reservoir further comprises a mix inlet valve, a purified mix outlet valve and a carbon dioxide outlet valve, and said electronic control circuit is configured to close said mix inlet valve and said purified mix outlet valve and to open the carbon dioxide outlet valve when said electronic control circuit causes heating of said reservoir.

* * * * *